United States Patent
Dannoux et al.

(10) Patent No.: US 8,833,106 B2
(45) Date of Patent: Sep. 16, 2014

(54) THERMO-MECHANICAL REFORMING METHOD AND SYSTEM AND MECHANICAL REFORMING TOOL

(71) Applicants: Thierry Luc Alain Dannoux, Avon (FR); Arnaud Dejean, Vaux le Penil (FR); Paul Louis Florent Delautre, Lisses (FR); Allan Mark Fredholm, Vulaines sur Seine (FR); Laurent Joubaud, Paris (FR); Stephane Poissy, Brunoy (FR)

(72) Inventors: Thierry Luc Alain Dannoux, Avon (FR); Arnaud Dejean, Vaux le Penil (FR); Paul Louis Florent Delautre, Lisses (FR); Allan Mark Fredholm, Vulaines sur Seine (FR); Laurent Joubaud, Paris (FR); Stephane Poissy, Brunoy (FR)

(73) Assignee: Corning Incorporated, Corning, NY (US)

( * ) Notice: Subject to any disclaimer, the term of this patent is extended or adjusted under 35 U.S.C. 154(b) by 102 days.

(21) Appl. No.: 13/622,067

(22) Filed: Sep. 18, 2012

(65) Prior Publication Data
US 2014/0075996 A1 Mar. 20, 2014

(51) Int. Cl.
*C03B 23/023* (2006.01)
*C03B 29/02* (2006.01)

(52) U.S. Cl.
USPC .................................. 65/106; 65/107; 65/291

(58) Field of Classification Search
CPC ............ C03B 23/0235; C03B 23/0256; C03B 23/0258; C03B 23/0305; C03B 23/0307
USPC ............................ 65/106, 107, 291
See application file for complete search history.

(56) References Cited

U.S. PATENT DOCUMENTS

| | | | | |
|---|---|---|---|---|
| 3,281,227 A * | 10/1966 | Leflet, Jr. et al. | ................. | 65/62 |
| 3,340,037 A * | 9/1967 | Stevenson | ........................ | 65/287 |
| 3,762,903 A * | 10/1973 | Hamilton | ........................ | 65/107 |
| 3,865,680 A * | 2/1975 | Reese et al. | .................... | 428/174 |
| 4,081,263 A * | 3/1978 | Mestre et al. | .................... | 65/106 |
| 4,229,200 A * | 10/1980 | Seymour | ........................ | 65/106 |
| 4,229,201 A * | 10/1980 | Comperatore et al. | ......... | 65/287 |
| 4,286,980 A * | 9/1981 | Matsuzaki et al. | .............. | 65/106 |
| 4,720,296 A * | 1/1988 | Bartusel et al. | ................. | 65/290 |

(Continued)

FOREIGN PATENT DOCUMENTS

| | | | | |
|---|---|---|---|---|
| EP | 2457881 | | 5/2012 | |
| JP | 63021229 A | * | 1/1988 | ............ C03B 23/025 |

(Continued)

OTHER PUBLICATIONS

English Language Translation of JP63-021229.*

(Continued)

*Primary Examiner* — Jason L Lazorcik
(74) *Attorney, Agent, or Firm* — John T. Haran (57) ABSTRACT

A reformable area and a non-reformable area of a sheet of glass material are heated to a first temperature corresponding to a first viscosity. The reformable area is subsequently locally heated to a second temperature corresponding to a second viscosity, where the second viscosity is lower than the first viscosity. A bend is formed in the reformable area during the local heating of the reformable area by contacting a first pusher with the non-reformable area and translating the first pusher along a linear path to apply a pushing force to the non-reformable area that results in the bend in the reformable area or by contacting a second pusher with an edge area of the reformable area and rotating the pusher along a circular path to apply a pushing force to the edge area of the reformable area that results in the bend in the reformable area.

22 Claims, 7 Drawing Sheets

(56) References Cited

U.S. PATENT DOCUMENTS

| | | |
|---|---|---|
| 5,093,177 A | 3/1992 | Anderson et al. |
| 5,167,689 A | 12/1992 | Weber |
| 5,322,539 A | 6/1994 | Mathisen et al. ............... 65/42 |
| 6,240,746 B1 | 6/2001 | Maeda et al. |
| 6,422,040 B1 | 7/2002 | McMaster et al. |
| 8,397,540 B2 * | 3/2013 | Dannoux et al. ............... 65/291 |
| 8,549,885 B2 * | 10/2013 | Dannoux et al. ............... 65/359 |
| 2002/0020192 A1 * | 2/2002 | Bader et al. ............... 65/33.1 |
| 2009/0277224 A1 * | 11/2009 | Angel et al. ............... 65/60.1 |
| 2010/0140848 A1 * | 6/2010 | Provence ............... 264/339 |
| 2012/0114901 A1 * | 5/2012 | Uraji et al. ............... 428/121 |
| 2012/0131961 A1 * | 5/2012 | Dannoux et al. ............... 65/103 |
| 2012/0279257 A1 * | 11/2012 | Dannoux et al. ............... 65/103 |
| 2013/0086948 A1 * | 4/2013 | Bisson et al. ............... 65/106 |
| 2013/0125589 A1 * | 5/2013 | Dannoux et al. ............... 65/106 |
| 2013/0125592 A1 * | 5/2013 | Bisson ............... 65/273 |
| 2013/0329346 A1 * | 12/2013 | Dannoux et al. ............ 361/679.01 |
| 2013/0337224 A1 * | 12/2013 | Odani et al. ............... 428/130 |
| 2014/0026621 A1 * | 1/2014 | Dannoux et al. ............... 65/106 |
| 2014/0033770 A1 * | 2/2014 | Dannoux et al. ............... 65/158 |

FOREIGN PATENT DOCUMENTS

| | | | |
|---|---|---|---|
| JP | 6-321229 | 11/1994 | |
| JP | 11322353 A * | 11/1999 | ............. C03B 20/00 |
| WO | 2004087590 A2 | 10/2004 | |
| WO | 2005/042420 | 5/2005 | |
| WO | 2008075906 A1 | 6/2008 | |

OTHER PUBLICATIONS

International Searching Authority: International Search Report; Mailing Date: Feb. 26, 2013; pp. 1-3.

* cited by examiner

THERMO-MECHANICAL REFORMING METHOD AND SYSTEM AND MECHANICAL REFORMING TOOL

CROSS-REFERENCE TO RELATED APPLICATIONS

This application claims the benefit of priority under 35 U.S.C. §119 of U.S. Provisional Application Ser. No. 61/546,687 filed on Oct. 13, 2011, the content of which is relied upon and incorporated herein by reference in its entirety.

TECHNICAL FIELD

The present invention relates generally to thermal reforming of flat (two-dimensional) glass sheets into shaped (three-dimensional) glass articles.

BACKGROUND

Numerous industrial activities exist in the field of reforming flat glass sheets. Currently, these activities are mostly for making shaped glass articles for automotive applications, e.g., windshields and side windows, and architectural applications, e.g., curved glass for architectural and commercial non-electronic displays. Reforming processes for these applications are typically characterized by limited glass deformation, curvatures with large radii (usually greater than 50 mm), and large glass sheet thicknesses (usually greater than 1.5 mm).

Reforming processes based on gravity sagging are known in the current art. See, e.g., U.S. Pat. No. 6,240,746 B1, "Glass plate bending method and apparatus," 5 Jun. 2001 [1]. In gravity sagging, the glass sheet is positioned on a ring or skeleton that supports the periphery of the glass sheet. The system is then heated to a temperature close to the softening point of the glass. Under gravity, the glass sags, eventually assuming the desired shape. Differential heating of some regions of the glass sheet can be used to obtain some final shapes that cannot be reached solely by isothermal gravity sagging. For some special shapes, more advanced techniques have been developed that are based on articulated skeletons (see, e.g., U.S. Pat. No. 4,286,980 A, "Method and apparatus for forming bent plate glass," 1 Sep. 1981 [2] and U.S. Pat. No. 5,167,689, "Process for bending glass sheets," 1 Dec. 1992 [3]). The idea is to have the skeleton articulated so that at some point during the gravity sagging process the outer shape of the supporting frame is modified to eventually obtain a more complex design, for example, a smaller local radius of curvature.

Reforming processes based on press bending are known in the art. See, e.g., U.S. Pat. No. 6,422,040, "Method for forming glass sheets" [4] and WO 2004 087590 A2, "Method for crowning sheets of glass by pressing and suction," 14 Oct. 2004 [5]. In press bending, the glass sheet is shaped by contact with a central male mold, with an external female mold pressing the periphery of the glass to the central male mold. This process has the ability to obtain curvatures with relatively small radii, e.g., as small as 10 mm (see, ref. [5] above), and relatively complex shapes.

Nowadays, interest is growing in high-quality, thin-walled, shaped glass articles, and in particular shaped glass articles having a combination of flat area(s) and bent area(s), the bent area(s) typically having highly curved shapes. These complex shaped glass articles are desired for use as glass covers or doors or windows in portable electronic devices, such as tablets and smart phones, and larger smart appliances, such as television sets and refrigerators. These newer applications generally have the following requirements for shaped glass articles: curvatures with small radii, e.g., less than 20 mm, in the bent area(s), almost perfect flatness and optical quality in the flat area(s), bent area(s) that may be located very close to the outermost edge of the glass, and bend angle that can be greater than 90 degrees. These requirements are difficult to achieve using reforming processes such as described above.

SUMMARY

A thermo-mechanical reforming method according to one aspect of the present invention includes heating a reformable area and a non-reformable area of a sheet of glass material to a first temperature corresponding to a first viscosity (step (a)). The reformable area is subsequently locally heated to a second temperature corresponding to a second viscosity, where the second viscosity is lower than the first viscosity (step (b)). A predetermined bend is formed in the reformable area during step (b) using a first forming method or a second forming method (step (c)). The first forming method includes contacting a first pusher with the non-reformable area and translating the first pusher along a linear path to apply a pushing force to the non-reformable area that results in the predetermined bend in the reformable area (step (c1)). The second forming method includes contacting a second pusher with an edge area of the reformable area and rotating the second pusher along a circular path to apply a pushing force to the edge area of the reformable area that results in the predetermined bend in the reformable area (step (c2)).

In one embodiment of the thermo-mechanical reforming method, where step (c1) is used in step (c), contacting the first pusher with the non-reformable area during step (c1) includes contacting a curved surface of the first pusher with the non-reformable area.

In one embodiment of the thermo-mechanical reforming method, where step (c2) is used in step (c), contacting the second pusher with the edge area of the reformable area during step (c2) includes contacting the edge area of the reformable area with a flat surface of the second pusher.

In one embodiment of the thermo-mechanical reforming method, during step (b), the reformable area is allowed to sag by gravity into an initial bend having an initial bend angle (step (d)).

In one embodiment of the thermo-mechanical reforming method, where step (c1) is used in step (c), step (d) precedes step (c1), the initial bend is formed into the predetermined bend during step (c1), and the predetermined bend has a final bend angle larger than the initial bend angle at the end of step (c).

In one embodiment of the thermo-mechanical reforming method, where step (d) precedes step (c1), step (c1) starts when the initial bend angle is in a range from 70 to 90 degrees.

In one embodiment of the thermo-mechanical reforming method, after the predetermined bend has been formed in step (c), the temperature in the reformable area is allowed to drop to a temperature between the first temperature and the second temperature (step (e)). During step (e), the first pusher is held in contact with the non-reformable area (where step (c1) was used in step (c)) or second pusher is held in contact with the edge area of the reformable area (where step (c2) was used in step (c)).

In one embodiment of the thermo-mechanical reforming method, step (c) starts when the reformable area is at a third temperature corresponding to a third viscosity that is at least an order of magnitude lower than the first viscosity, where the third temperature is between the first temperature and the second temperature.

In one embodiment of the thermo-mechanical reforming method, at the end of step (c), the predetermined bend has a final bend radius less than 20 mm.

In one embodiment of the thermo-mechanical reforming method, at the end of step (c), the predetermined bend has a final bend angle greater than 60 degrees.

In one embodiment of the thermo-mechanical reforming method, where step (c1) is used in step (c), the predetermined bend has a final bend angle greater than 90 degrees at the end of the step (c1).

In one embodiment of the thermo-mechanical reforming method, where step (c2) is used in step (c), the predetermined bend is formed within 20 mm of an outermost edge of the sheet of glass material.

In one embodiment of the thermo-mechanical reforming method, the sheet of glass material heated in step (a) is provided with a thickness in a range from 0.3 mm to 1.5 mm.

In one embodiment of the thermo-mechanical reforming method, the sheet of glass material heated in step (a) is provided with a coefficient of thermal expansion greater than 5 ppm/K.

A mechanical reforming tool according to another aspect of the present invention includes a pusher member having a contact surface for contacting a sheet of material, a linear-to-rotary motion guide coupled to the pusher member, and an actuator coupled to the linear-to-rotary motion guide. The linear-to-rotary motion guide is configured to receive a linear motion, convert the linear motion to a rotary motion, and impart the rotary motion to the pusher member. The actuator is configured to provide the linear motion to the linear-to-rotary motion guide.

In one embodiment of the mechanical reforming tool, the linear-to-rotary motion guide comprises a pair of spaced-apart pivotable members, which are coupled to opposing ends of the pusher member. The spacing between the pivotable members is wide enough to receive an edge of the sheet of material.

In one embodiment of the mechanical reforming tool, the actuator has a movable arm coupled to the pivotable members. The movable arm is configured to transfer the linear motion from the actuator to the pivotable members.

In one embodiment of the mechanical reforming tool, the linear-to-rotary motion guide further comprises stop members for limiting pivoting of the pivotable members.

In one embodiment of the mechanical reforming tool, the contact surface of the pusher member is substantially flat.

A thermo-mechanical reforming system according to another aspect of the present invention includes one or more heaters, a pusher member, a linear-to-rotary motion guide, and an actuator. The one or more heaters are for selectively heating areas of a sheet of glass material. The pusher member has a contact surface for contacting the sheet of glass material in a selected area. The linear-to-rotary motion guide is coupled to the pusher member and is configured to receive a linear motion, convert the linear motion to a rotary motion, and impart the rotary motion to the pusher member. The actuator is coupled to the linear-to-rotary motion guide and is configured to provide the linear motion to the linear-to-rotary motion guide.

It is to be understood that both the foregoing general description and the following detailed description are exemplary of the present invention and are intended to provide an overview or framework for understanding the nature and character of the invention as it is claimed. The accompanying drawings are included to provide a further understanding of the present invention and are incorporated in and constitute a part of this specification. The drawings illustrate various embodiments of the present invention and together with the description serve to explain the principles and operation of the present invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

In the following detailed description, numerous specific details may be set forth in order to provide a thorough understanding of embodiments of the present invention. However, it will be clear to one skilled in the art when embodiments of the present invention may be practiced without some or all of these specific details. In other instances, well-known features or processes may not be described in detail so as not to unnecessarily obscure the invention. In addition, like or identical reference numerals may be used to identify common or similar elements.

Herein, a thermo-mechanical method for reforming a sheet of glass material into a shaped article having flat and bent areas is disclosed. In one embodiment, the glass material is glass. In another embodiment, the glass material is glass-ceramic. In one embodiment, the sheet of glass material is thin, e.g., having a thickness in a range from 0.3 mm to 1.5 mm. In one embodiment, the sheet of glass material has a coefficient of thermal expansion greater than 5 ppm/K. An example of a suitable glass for use as the glass material is GORILLA® glass, which is available from Corning Incorporated, New York. In some embodiments, it is desired that the suitable glass is an ion-exchangeable glass, where the structure of the ion-exchangeable glass contains small alkali metal or alkaline earth metal ions that can be exchanged for larger alkali metal or alkaline earth metal ions.

The sheet of glass material provided is a flat sheet of glass material. Such a flat sheet may be produced using any suitable method for producing flat sheets of glass material, such as overflow fusion downdraw process or a float process. The sheet of glass material has at least one reformable area and at least one non-reformable area. Here, the term "non-reformable area" does not mean that the area cannot be reformed, but that the area will not be or is not reformed. The glass material composition of the reformable area(s) will typically be the same as that of the non-reformable area(s). However, it is also possible that there could be differences in the glass material composition of the reformable area(s) and non-reformable area(s), e.g., if it is desired that the reformable area(s) or non-reformable area(s) should have special properties. In general, the reformable area(s) will be contiguous with the non-reformable area(s), with each reformable area having at least one non-reformable area as a neighbor. The number and location of reformable and non-reformable areas on the sheet of glass material will depend on the desired final shape of the shaped article.

Figure 1A:
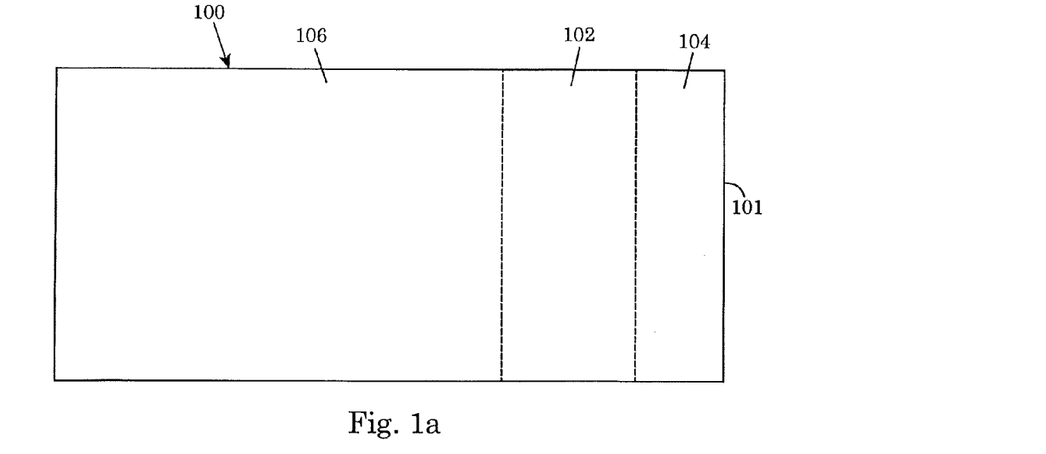
FIG. 1a shows a sheet of glass material having an inwardly-located reformable area.
Figure 1B:
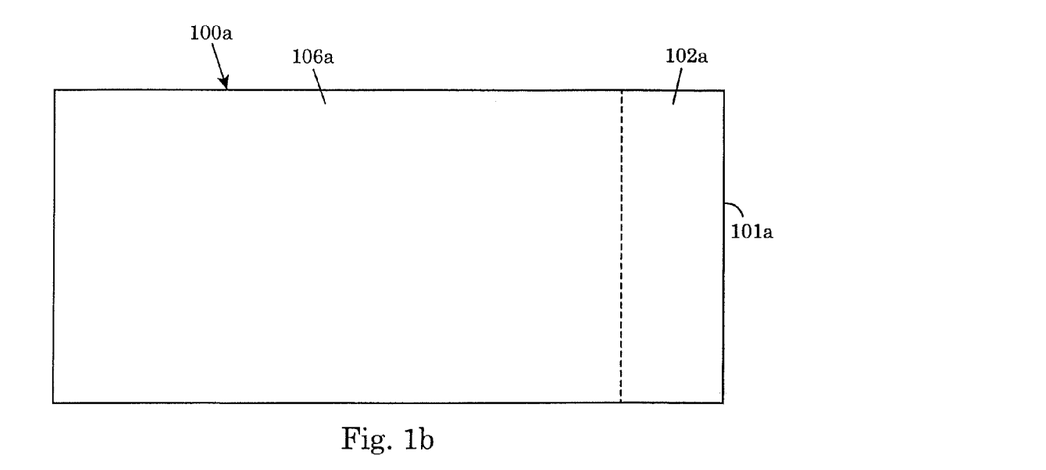
FIG. 1b shows a sheet of glass material having an edge-located reformable area.

For illustration purposes, FIG. 1a shows an example of a sheet of glass material 100 having a reformable area 102 and non-reformable areas 104, 106. FIG. 1b shows an example of a sheet of glass material 100a having a reformable area 102a and non-reformable area 106a. The reformable area 102 of FIG. 1a is inwardly-located relative to the edge 101 of the sheet of glass material 100. On the other hand, the reformable area of FIG. 1b is edge-located relative to the edge 101a of the sheet of glass material 100a. As will be shown later, the location of the reformable areas 102, 102a on the sheets of glass material 100, 100a, respectively, would have a bearing on how the reformable areas are mechanically reformed.

Initially, since the sheet of glass material (e.g., 100 in FIG. 1a, 100a in FIG. 1b) is flat, the reformable area(s) (e.g., 102 in FIG. 1a, 102a in FIG. 1b) and non-reformable area(s) (e.g., 104, 106 in FIG. 1a, 106a in FIG. 1b) will also be flat. Later on, the reformable area(s) will be formed into a three-dimensional shape and will no longer be flat, but the non-reformable area(s) will remain flat. Typically, the three-dimensional shape will include at least one bend having a predetermined radius of curvature. The predetermined radius of curvature will depend on the desired final shape of the shaped article. In one embodiment, a small radius of curvature, e.g., less than 20 mm, is formed in a reformable area. In one embodiment, the final bend angle formed in a reformable area is greater than 60 degrees. In another embodiment, the final bend angle formed in a reformable area is greater than 90 degrees. In one embodiment, the reformable area is edge-located and the bend formed in the edge-located reformable area is very close to an edge of the sheet of glass material containing the edge-located reformable area, e.g., within 20 mm of the edge of the sheet of glass material.

Figure 2A:
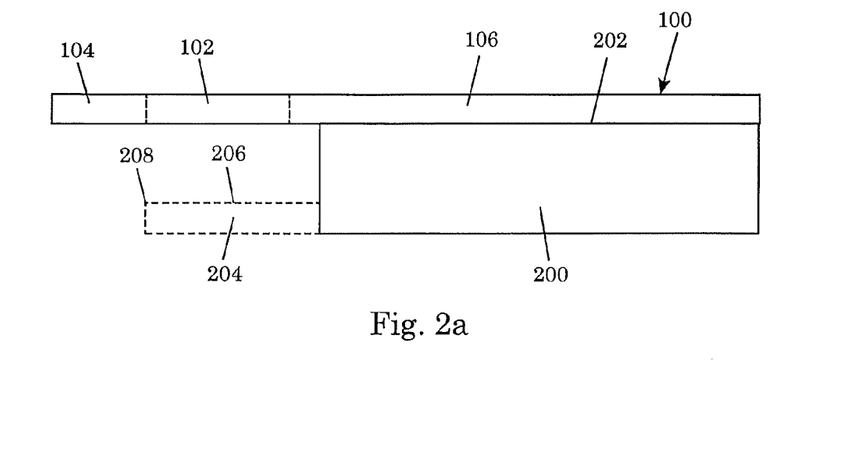
FIG. 2a shows a sheet of glass material on a support.

To make the shaped article, the sheet of glass material, such as shown in FIG. 1a or 1b, is placed on a support. The placing is such that a portion of the sheet of glass material that includes the reformable area overhangs the support. For illustration purposes, FIG. 2a shows the sheet of glass material 100 on a support 200. In one embodiment, the support 200 has a planar support surface 202 for supporting the sheet of glass material 100. The sheet of glass material 100 is placed on the support surface 202 such that the reformable area 102 and non-reformable area 104 overhang the support 200. The non-reformable area 104 is outboard of the reformable area 102 and edge-located on the sheet of material 100, which makes the non-reformable area 104 suitable for mechanical contact to form a bend in the reformable area 102. The support surface 202 that comes into contact with the glass material is preferably made of or coated or plated with a high temperature material. Examples of such high temperature materials include ceramics, glass-ceramics, refractory alloys, and superalloys such as INCONEL 600 and INCONEL 718.

A stopper 204 may be placed adjacent to or integrated with the support 200. The stopper 204 has a stopper surface 206 that is in opposing relation to the reformable area 102. However, the stopper surface 206 is offset a distance from the support surface 202 so that there is room for the reformable area 102 to bend downwardly when heated to a reforming temperature. In this embodiment, the stopper surface edge 208 can function to limit the extent of the bend. The stopper 204 may be made of the same material as the support 200. The stopper surface 206 or stopper surface edge 208 that may come into contact with the non-reformable area 104 or reformable area 102 may be made of or coated or plated with a high temperature material as described above for the support surface 202.

Figure 2B:
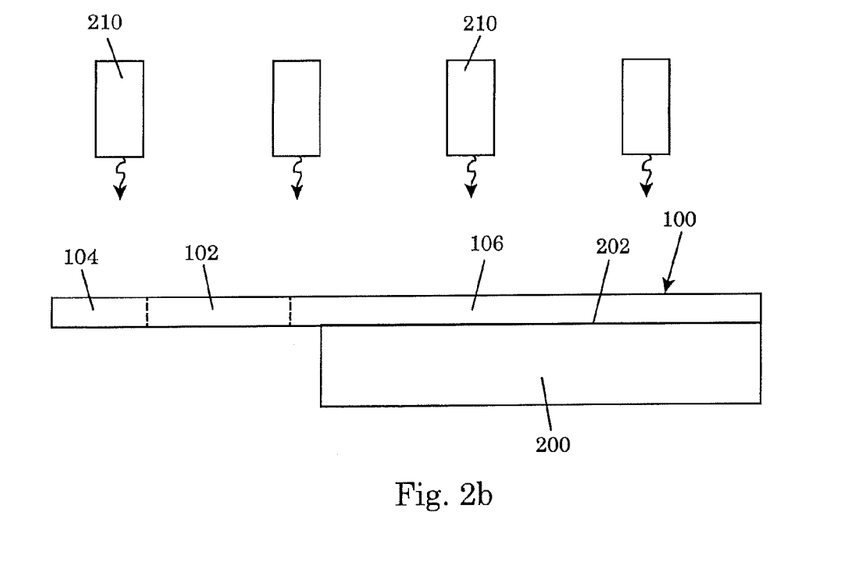
FIG. 2b shows heaters directing heat to reformable and non-reformable areas of a sheet of glass material.
Figure 3:
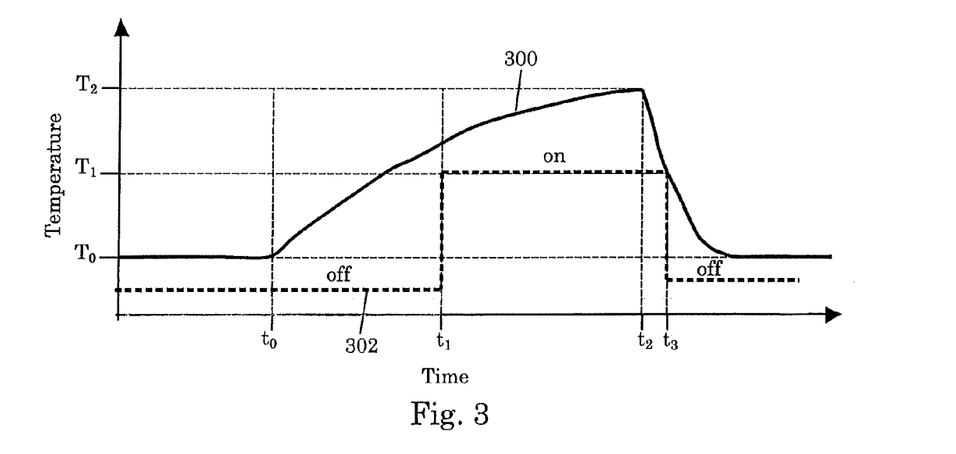
FIG. 3 shows temperature evolution in a reformable area of a sheet of glass material during a process for reforming the sheet of glass material.

FIG. 3 shows a typical process sequence for making the shaped article from the sheet of glass material 100. Line 300 shows the temperature evolution in the reformable area 102 during the reforming process, and line 302 shows when mechanical reforming is on or off during the reforming process. Before time $t_0$, the reformable area 102 (in FIG. 2b) and non-reformable areas 104, 106 (in FIG. 2b) of the sheet of glass material 100 (in FIG. 2b), i.e., the entire sheet of glass material 100, are heated to a temperature $T_0$. FIG. 2b shows heaters 210 directing heat to the entire sheet of glass material 100. The heaters 210 may be any heaters capable of delivering heat controllably to the sheet of glass material 100, such as gas burners, resistive-type filaments, and plasma torches.

In FIG. 3, a numerical value or range of values has not been specified for temperature $T_0$. This is because the value of the temperature $T_0$ will depend on the composition of the sheet of glass material 100 (in FIG. 2b). However, one of skill in the art will know how to select the temperature $T_0$ based on the following additional description of the temperature $T_0$. Preferably, temperature $T_0$ is low enough to avoid deformation of or optical quality defects in the sheet of glass material 100 but high enough to avoid breakage of the sheet of glass material 100 due to dilatation mismatch when the reformable area 102 is subsequently heated locally. In one embodiment, the viscosity of the glass material at temperature $T_0$ is greater than $6 \times 10^9$ Poise. In another embodiment, the viscosity of the glass material at temperature $T_0$ is greater than $6 \times 10^9$ Poise but not greater than $10^{12}$ Poise.

From time $t_0$ to time $t_1$ to time $t_2$, the reformable area 102 (in FIG. 2c) is locally heated, and the temperature of the reformable area 102 goes from temperature $T_0$ at time $t_0$ to temperature $T_1$ at time $t_1$ to temperature $T_2$ at time $t_2$, where $T_0 < T_1 < T_2$. From time $t_2$ to time $t_3$, local heating of the reformable area 102 is turned off, and the temperature of the reformable area 102 drops from temperature $T_2$ at time $t_2$ to a temperature between $T_0$ and $T_2$ at time $t_3$. This temperature between $T_0$ and $T_2$ at time $t_3$ may be at or near temperature $T_1$.

For any time t between time $t_0$ and time $t_2$, the temperature in the non-reformable areas 104, 106 (in FIG. 2c) is lower than the temperature in the reformable area 102. Preferably, from time $t_0$ to time $t_2$, the average temperature in the non-reformable areas 104, 106 is approximately equal to or near temperature $T_0$. For example, the average temperature could be within $T_0 +/- 15°$ C. This may mean that the non-reformable areas 104, 106 are not heated or that the non-reformable areas 104, 106 are locally heated to maintain their temperatures at or near temperature $T_0$. Beyond time $t_2$, the temperature of the reformable area 102 (in FIG. 2c) starts to drop and will eventually converge with that of the non-reformable areas 104, 106, e.g., at temperature $T_0$.

Figure 2C:
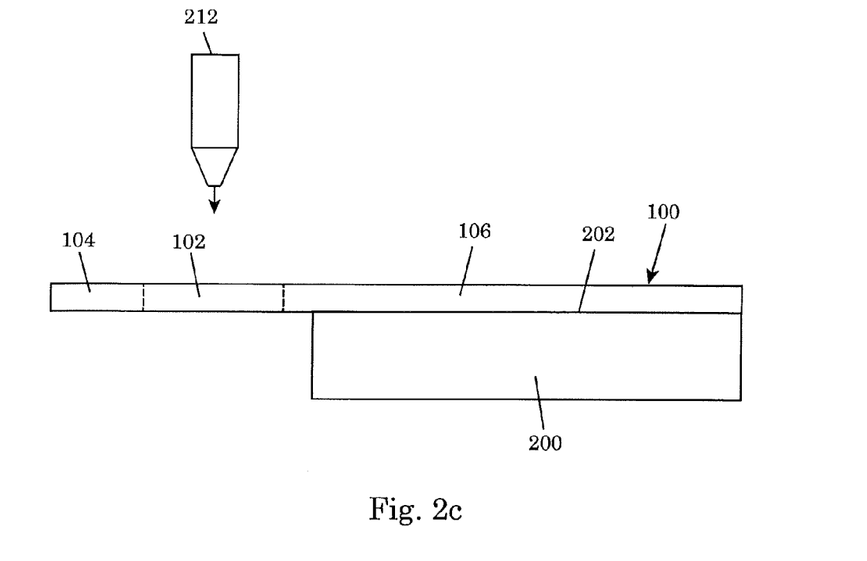
FIG. 2c shows heaters directing heating to a reformable area of a sheet of glass material.

FIG. 2c shows a heater 212 (a plurality of heaters could be used if needed) directing heat to the reformable area 102 from time $t_0$ to time $t_2$ (in FIG. 3). Preferably, the heaters 212 are configured to provide focused heating to the reformable area 102 so that the desired differentiation in temperatures between the reformable area 102 and the non-reformable areas 104, 106 from time t0 to time $t_2$, as described above, can be maintained. This differentiation in temperatures between the reformable and non-reformable areas, and therefore differentiation in glass material viscosities between the reformable and non-reformable areas, is used to limit any deformation of the glass material to the reformable area 102. As examples, such focused heating may be convective heating provided by a gas burner with a nozzle for focusing the heat from the gas burner or radiative heating provided by a resistive heater with optical element(s), such as a high-temperature elliptical mirror, for focusing the heat from the resistive heater. Other focused heating arrangements besides those mentioned above may also be used.

Reforming of the reformable area 102 takes place from time $t_0$ to time $t_3$ (in FIG. 3). From time $t_0$ to time $t_1$ (in FIG. 3), reforming of the reformable area 102 is solely due to thermal influence. During this period, the reformable area 102 may begin to sag due to gravity. At time $t_1$, when the reformable area 102 is at temperature $T_1$, mechanical influence is added to the reforming of the reformable area 102. For the sheet of material 100 having the inwardly-located reformable area 102, mechanical reforming involves contacting a pusher with the non-reformable area 104 and pushing on the non-reformable area 104 in order to produce a predetermined bend in the reformable area 102. If a bend had already been formed in the reformable area 102 due to sagging, the mechanical reforming will increase the bend angle to the predetermined or desired bend angle. With this mechanical reforming, which will be further described below, quite large bend angles, such as bend angles greater than 90 degrees, can be achieved. A different strategy is used for mechanical reforming when the reformable area is edge-located. This different strategy will also be described below.

In FIG. 3, a numerical value or range of values has not been specified for temperature $T_1$ because temperature $T_1$ will depend on the composition of the glass material and whether any substantial sagging of the glass in the reformable area 102 (in FIG. 2c) is desired before mechanical reforming. However, one of skill in the art will be able to determine temperature $T_1$ based on the following additional description of temperature $T_1$. Temperature $T_1$ is high enough to allow deformation of the reformable area 102. The viscosity of the glass material at temperature $T_1$ is at least one order of magnitude (i.e., at least 10 times) lower than the viscosity of the glass material at temperature $T_0$. This restricts deformation of the glass material substantially to the reformable area 102, if the non-reformable areas 104, 106 (in FIG. 2c) are kept at or near the temperature $T_0$. In one embodiment, the viscosity of the glass material at temperature $T_1$ is not greater than $10^9$ Poise. In another embodiment, the viscosity of the glass material is in a range from $10^8$ Poise to $10^9$ Poise. In another embodiment, the temperature $T_1$ is in a forming temperature range of the glass material. In another embodiment, the temperature $T_1$ is between the softening point and the annealing point of the glass material. In another embodiment, the temperature $T_1$ is at least 10° C. below the softening point of the glass material.

From time $t_2$ to time $t_3$, local heating of the reformable area 102 (in FIG. 2c) is turned off, and the temperature of the reformable area 102 is allowed to drop from temperature $T_2$ to temperature $T_1$ (or near temperature $T_1$). (Temperature $T_2$ has the same properties as described above for temperature $T_1$, except that temperature $T_2$ is greater than temperature $T_1$.) Mechanical reforming continues from time $t_2$ to time $t_3$, even while local heating has been turned off. However, this portion of the mechanical reforming involves holding the non-reformable area 104 rather than pushing on the non-reformable area 104. During this holding, the bend formed in the reformable area 102 is reinforced. Beyond time $t_3$, the temperature of the reformable area 102 is allowed to drop down to temperature $T_0$ or to the same temperature as the non-reformable areas 104, 106.

Beyond time $t_3$, the sheet of glass material with the predetermined bend in the reformable area 102 may be described as a shaped article. The shaped article can be allowed to cool down further to a temperature below temperature $T_0$. The shaped article may be allowed to cool down further to a temperature at which the viscosity of the glass material is approximately $10^{13}$ Poise or greater. After this cooling down, various processes may be applied to the shaped article. For example, the shaped article may be annealed. The edge(s) of the shaped article may be finished, trimmed, or contoured, to achieve a final size or shape. The shaped article may be subjected to an ion-exchange process for strengthening. An anti-smudge coating may be applied on a surface of the shaped article.

Figure 4A:
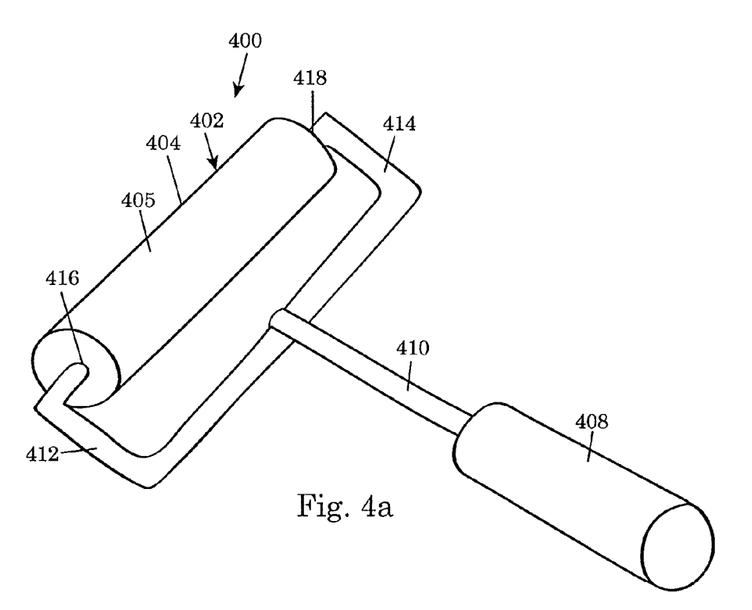
FIG. 4a shows a mechanical reforming tool for forming a bend in an inwardly-located reformable area.

FIG. 4a shows a mechanical reforming tool 400 for mechanically reforming an inwardly-located reformable area of a sheet of glass material, such as reformable area 102 in FIG. 1a. The mechanical reforming tool 400 includes a curved-contact pusher 402. In one embodiment, the curved-contact pusher 402 has an elongated pusher body 404 with a curved surface 405 for contacting a sheet of glass material. In one embodiment, the curved surface 405 is convex. The curved surface 405 is made of or plated with a material that would not stick to the glass material at reforming temperatures. This may be the same types of high temperature materials described above for the support 200 (in FIG. 2a).

The mechanical reforming tool 400 includes an actuator 408 having a movable arm 410. Prongs 412, 414 couple the movable arm 410 to opposing sides of the elongated pusher body 404. The joints between the prongs 412, 414 and the elongated pusher body 404 may be fixed or rotatable. The actuator 408 can be controlled to extend the pusher 402 to contact a surface of the sheet of glass material and then apply a force to the surface of the sheet of glass material. This force can be used to form a bend in a reformable area of the sheet of glass material. In one embodiment, the actuator 408 is a linear actuator so that the pusher 402 travels along a linear path during the previously mentioned extension of the pusher 402. The actuator 408 and movable arm 410 constitute a linear force control system and can be implemented in a variety of ways. For example, the actuator 408 and movable arm 410 could be a pneumatic cylinder.

Figure 4B:
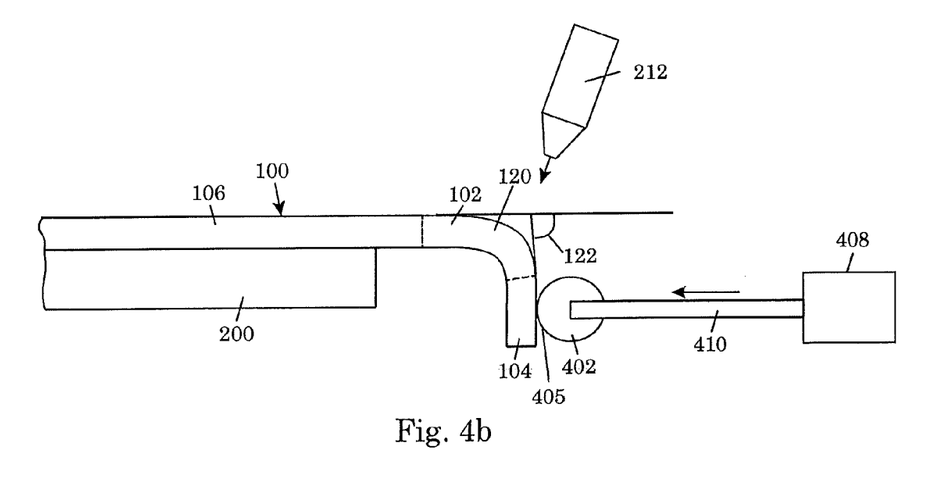
FIG. 4b shows a pusher of a mechanical reforming tool in contact with a non-reformable area of a sheet of glass material.
Figure 4C:
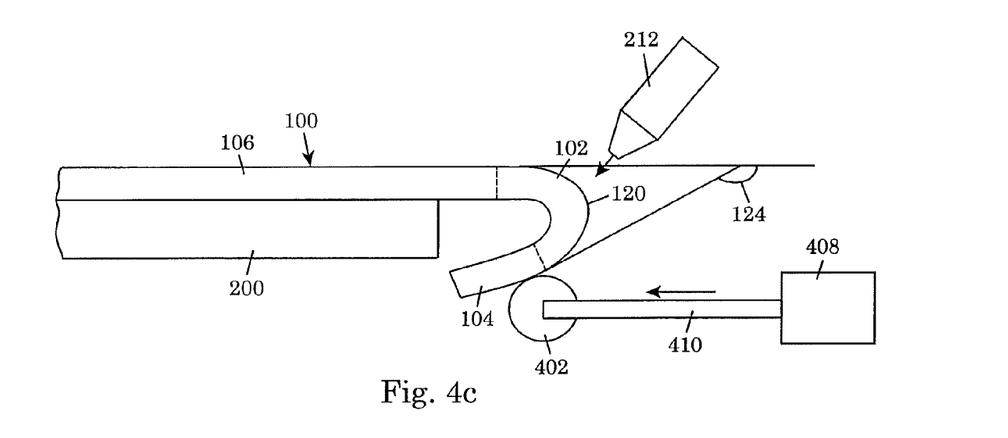
FIG. 4c shows a pusher of a mechanical reforming tool applying a pushing force to a non-reformable area of a sheet of glass material.

FIGS. 4b and 4c show how the mechanical reforming tool 400 is used to form a bend in the reformable area 102. In one embodiment, at time $t_1$ (in FIG. 3), the reformable area 102 has already sagged down due to gravity, and an initial bend 120 has already been formed in the reformable area 102 due to the sagging. In one embodiment, this initial bend 120 may have an initial bend angle 122 in a range from about 70 degrees to about 90 degrees. Mechanical reforming starts at or after time $t_1$ by bringing the pusher 402 into opposing relation to the non-reformable area 104 and then in contact with the non-reformable area 104. Additional extension of the actuator movable arm 410 along a linear path maintains contact between the pusher contact surface 405 and the non-reformable area 104 and applies a pushing force to the non-reformable area 104. As the pushing force is applied to the non-reformable area 104, the bend angle in the reformable area 102 increases.

FIG. 4c shows that the actuator 408 advances the pusher 402 against the non-reformable area 104 along a linear path until a predetermined bend angle 124 has been formed in the reformable area 102. Time $t_2$ (in FIG. 3) is selected to coincide with when the predetermined bend angle 124 would be formed in the reformable area 102. At time $t_2$, the actuator 408 stops advancing the pusher 402 against the non-reformable area 104, e.g., by stopping further extension or driving of the movable arm 410. From time $t_2$ to time $t_3$ (in FIG. 3), the actuator 408 holds the pusher 402 in contact with the non-reformable area 104, thereby applying a resisting force to the non-reformable area 104. This resisting force does not result in additional bending in the reformable area 102. Simultaneously, heating of the reformable area 102 is turned off. By time $t_3$, the reformable area 102 has cooled down enough to hold the predetermined bend angle 124. At time $t_3$, the actuator 408 removes the pusher 402 from contact with the non-reformable area 104, e.g., by retracting the movable arm 410.

Figure 4D:
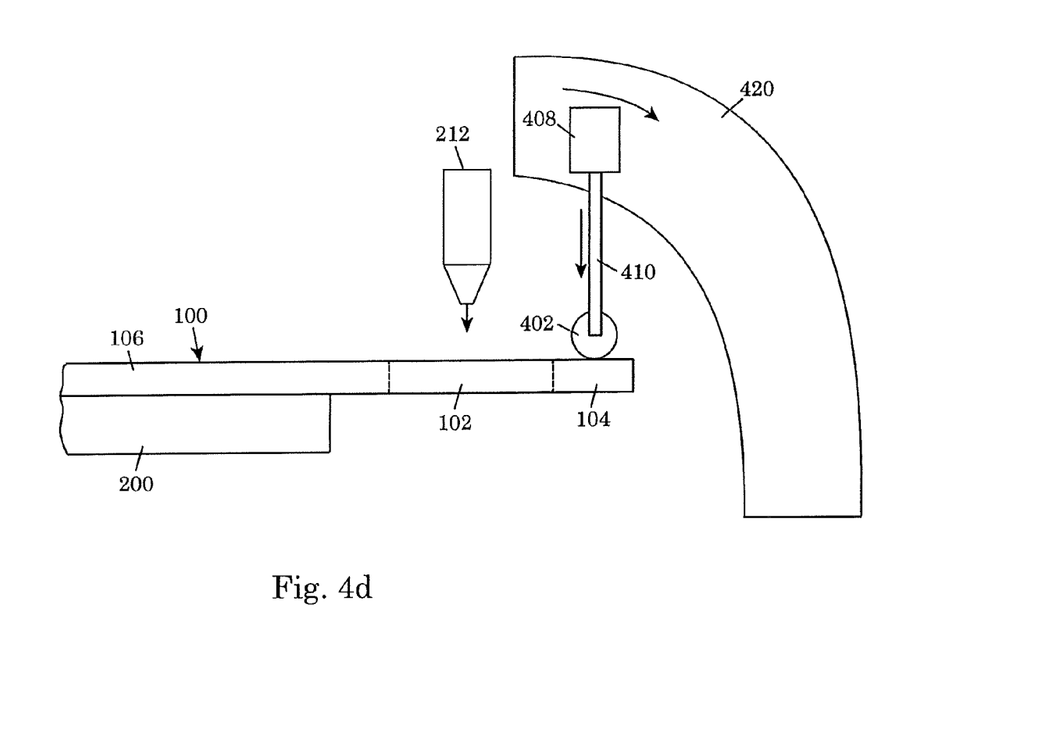
FIG. 4d shows an actuator of a mechanical reforming tool mounted on a rotary stage.

The mechanical reforming tool 400 described above can also be used to form a bend in the reformable area 102 when there is no initial bend or only a small bend in the reformable area 102 at time $t_1$ (in FIG. 3). However, to form a large bend angle in this instance, it may be necessary to reposition the actuator 408 at some point during advancing of the pusher 402 against the non-reformable area 104 so that brushing of the movable arm 410, or other parts of the actuator 408, with the sheet of material 100 is avoided. In one example, such repositioning may be achieved automatically by mounting the actuator 408 on a rotary stage (e.g., 420 in FIG. 4d) so that the actuator 408 travels along a curved path as needed during time $t_1$ to $t_3$ (in FIG. 3). At each position of the actuator 408 along the curved path, the motion the actuator 408 provides to the pusher 402 through the movable arm 410 would still be along a linear path.

Figure 5A:
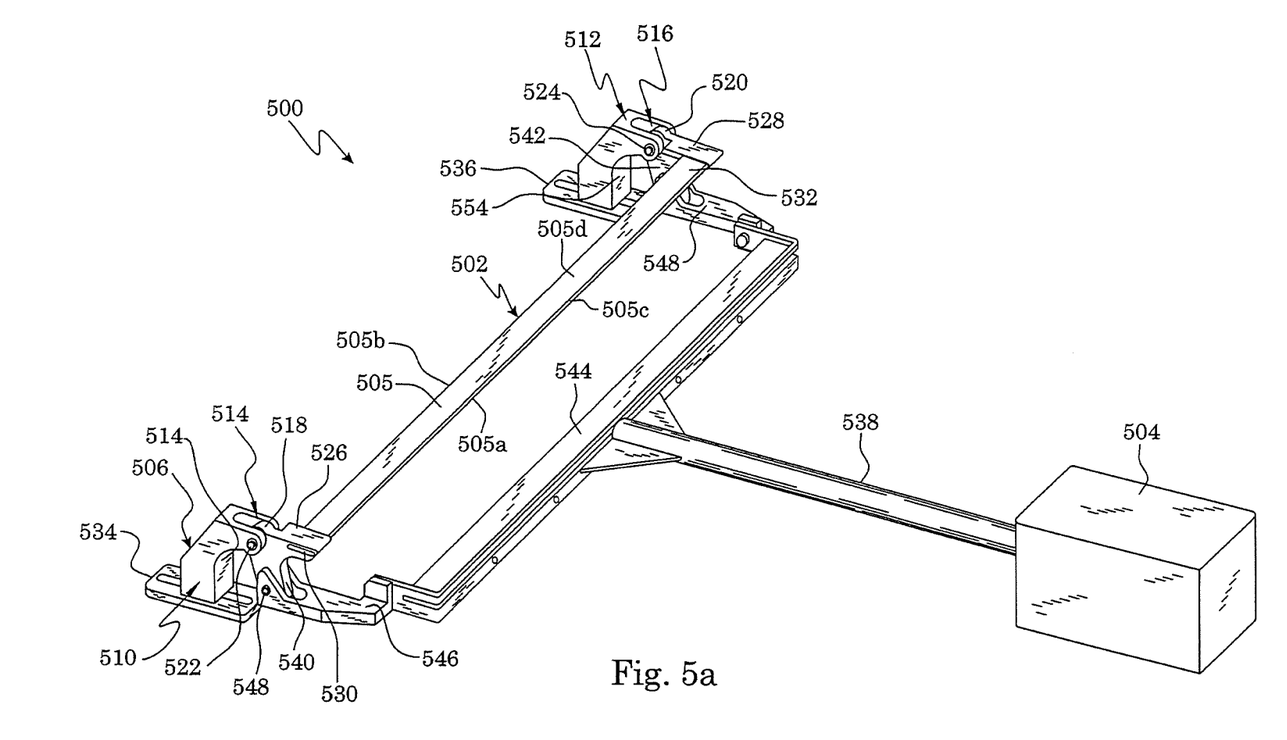
FIG. 5a shows a mechanical reforming tool for forming a bend in an edge-located reformable area.

FIG. 5a shows another mechanical reforming tool 500 for mechanically reforming a sheet of glass material. The mechanical reforming tool 500 includes a flat-contact pusher 502, an actuator 504, and a linear-to-rotary motion guide 506 that takes linear motion from the actuator 504 and converts it into rotary motion for the flat-contact pusher 502, enabling the flat-contact pusher 502 to travel along a circular path to impart a bend to the sheet of glass material in the reformable area.

In one embodiment, the flat-contact pusher 502 has an elongated body 505 with a flat bottom surface 505a (better seen in FIG. 5b) for contacting the sheet of glass material. In general, the flat bottom surface 505a should be narrow such that contact with the sheet of glass material is minimized. The leading edge 505b and trailing edge 505c of the elongated body 505 may each have a round shape, as shown, or may each have a different shape, e.g., a flat or beveled shape. The top surface 505d of the elongated body 505 may have a flat shape, as shown, or may have a different shape, e.g., a curved or beveled shape. In alternate embodiments, the mechanical reforming tool 500 may include a non-flat-contact pusher in lieu of the flat-contact pusher 502. For example, a curved-contact pusher, such as shown at 402 in FIG. 4a, may be used in place of the flat-contact pusher 502.

The linear-to-rotary motion guide 506 has supports 510, 512, which are spaced apart a sufficient distance to allow the edge of a sheet of glass material to be received between them. The guide 506 has angled brackets 514, 516. Corners 518, 520 of the angled brackets are coupled to the supports 510, 512 by pivoting joints 522, 524. Legs 526, 528 of the angled brackets 514, 516 are firmly attached to the ends 530, 532 of the elongated body 505, e.g., by fitting the elongated body ends 530, 532 into slots in the legs 526, 528. The support is such that in the neutral position of the angled brackets 514, 516, the flat bottom surface 505a of the pusher 502 is parallel to the bases 534, 536 of the supports 510, 512.

The actuator 504 has a movable arm 538, which is firmly attached to a yoke 544. Prongs 546, 548 of the yoke 544 are coupled to the legs 540, 542 via pivoting joints (only pivoting joint 548 is visible in the drawing (FIG. 5b)). Linear motion of the movable arm 538 in a direction towards the supports 510, 512 moves the angled brackets 514, 516 along a circular path, with the center of rotation of the angled brackets 514, 516 at the pivoting points 522, 524. Since the pusher 502 is coupled to the angled brackets 514, 516, the pusher 502 moves in a circular path with the angled brackets 514, 516. The movable arm 538 can continue to move linearly to result in motion of the pusher 502 along the circular path.

Figure 5B:
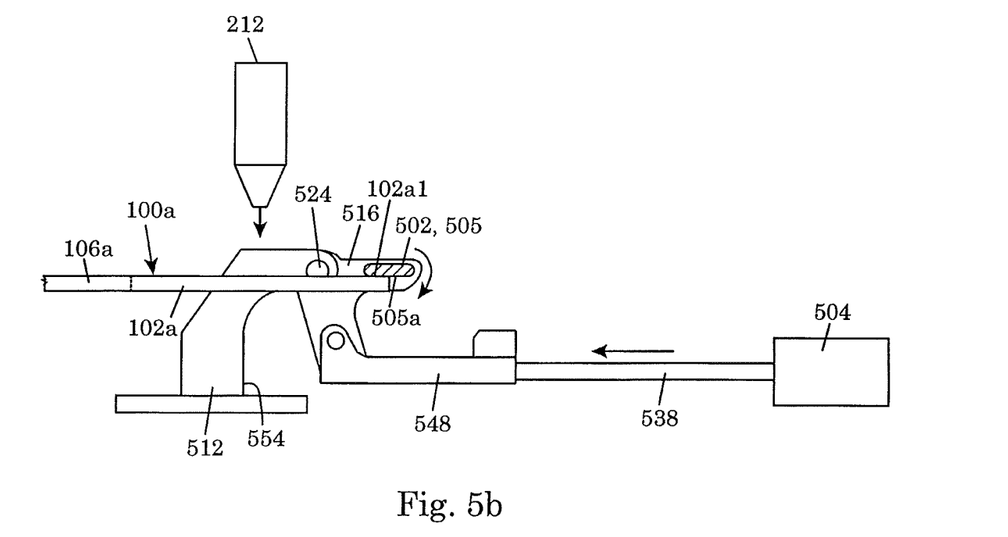
FIG. 5b shows a pusher of a mechanical reforming tool in contact with an edge area of a reformable area of a sheet of glass material.
Figure 5C:
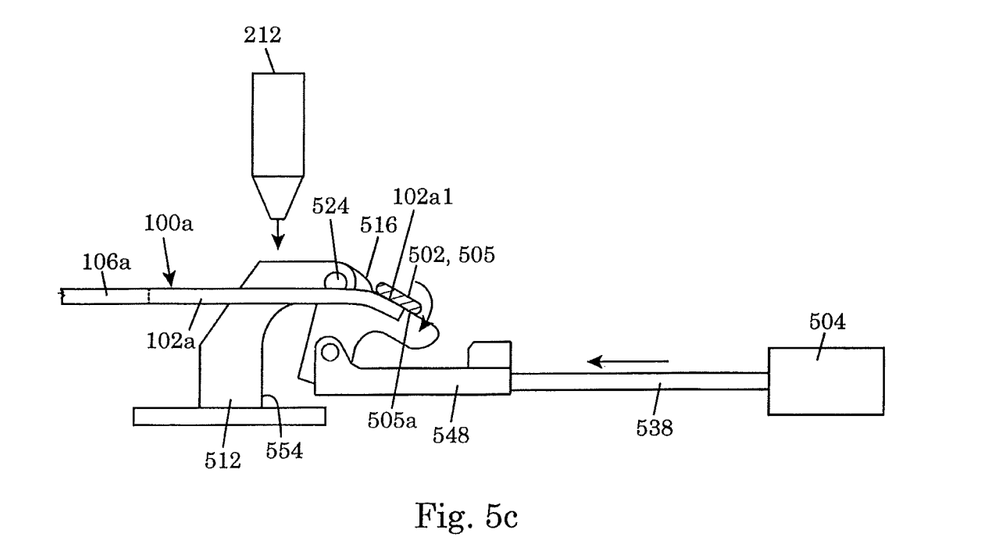
FIG. 5c shows a pusher of a mechanical reforming tool applying a pushing force to an edge area of a reformable area of a sheet of glass material.

FIG. 5b shows how the mechanical reforming tool 500 is used to form a bend in an edge-located reformable area of a sheet of glass material, such as reformable area 102a in FIG. 1b. The sheet of glass material 100a is heated to temperature $T_0$ (in FIG. 3) using a setup similar to the one shown in FIG. 2b for the sheet of glass material 100. At time $t_0$ (in FIG. 3), local heating of the reformable area 102a of the sheet of glass material 100a starts, e.g., using the heater 212. At time $t_1$ (in FIG. 3), the pusher 502 is advanced towards the sheet of glass material 100a until the flat bottom surface 505a makes contact with an edge area 102a1 of the reformable area 102a. The edge area 102a1 where the flat surface 505a contacts the reformable area 102a can be minimized and later machined off. With the pusher 502 in contact with edge area 102a1 of the reformable area 102, the actuator 504 translates or pushes the movable arm 538 in a direction towards the supports 510, 512, along a linear path. As shown in FIG. 5c, this rotates the angled brackets 516, 514 (in FIG. 5a) about the pivot joints 524, 522 (in FIG. 5a). Since the pusher 502 is attached to the angled brackets 514, 516, the pusher 502 also rotates, pushing down on the edge area 102a1 of the reformable area 102a and causing a bend to be formed in the reformable area 102a. The bend angle increases as the movable arm 538 further advances towards the supports 512, 510 (in FIG. 5a). The movable arm 538 may advance until the angled brackets 514, 516 reach the stop surfaces 554 (552 in FIG. 5a). In this embodiment, the bend can be formed very close to an outermost edge of the sheet of glass material 100a coinciding with the reformable area 102a, e.g., within 20 mm of the outermost edge (which is shown as 101a in FIG. 1b).

Rotation of the pusher 502 occurs from time $t_1$ to time $t_2$ (in FIG. 3). At or shortly after time $t_2$, rotation of the pusher 502 and local heating of the reformable area 102a are stopped. From time $t_2$ to time $t_3$, contact between the flat bottom surface 505 of the pusher 502 and the edge of the reformable area 102a is maintained so that the bend formed in the reformable area 102a via the pusher 502 is reinforced. However, the pusher 502 is not rotated during this time so that additional bending does not occur. After time $t_3$, the contact between the pusher 502 and the edge of the reformable area 102a is released or removed. This may be achieved by retracting the movable arm 538 so that the pusher 502 rotates back to its neutral position.

The mechanical reforming tool 500, with some modifications, may also be used to form a bend in an inwardly-located reformable area where an initial bend has not been formed in the reformable area or where only a small bend has been formed in the reformable area. One modification may be to replace the flat-contact pusher 502 with a curved-contact pusher, such as pusher 402 in FIG. 4a. Then, the range of motion of the angled brackets 514, 516 can be increased by relocating and resizing the stop surfaces 552, 554. In use, the curved surface of the curved-contact pusher would be brought into contact with the non-reformable area of the sheet of glass material and swinging of the angled brackets would move the curved-contact pusher along a circular path, while the curved-contact pusher is in contact with the non-reformable area, thereby creating a bend in the reformable area.

The invention claimed is:

1. A thermo-mechanical reforming method, comprising:
   (a) heating a reformable area and a non-reformable area of a sheet of glass material to a first temperature corresponding to a first viscosity;
   (b) subsequently locally heating the reformable area to a second temperature corresponding to a second viscosity, the second viscosity being lower than the first viscosity; and
   (c) forming a predetermined bend in the reformable area during step (b) by contacting a pusher with the non-reformable area and translating the pusher along a linear path by an actuator while repositioning the actuator along a curved path to apply a pushing force to the non-reformable area that results in the predetermined bend in the reformable area.

2. The method of claim 1, wherein contacting the pusher with the non-reformable area comprises contacting a curved surface of the pusher with the non-reformable area.

3. The method of claim 1, further comprising:
   (d) during step (b), allowing the reformable area to sag by gravity into an initial bend having an initial bend angle measured with respect to an initial position of the reformable area before sagging.

4. The method of claim 3, wherein step (d) precedes step (c), the initial bend is formed into the predetermined bend during step (c), and the predetermined bend has a final bend angle, measured with respect to an initial position of the reformable area before sagging, larger than the initial bend angle at an end of step (c).

5. The method of claim 4, wherein step (c) starts when the initial bend angle is in a range from 70 to 90 degrees.

6. The method of claim 1, further comprising:
   (e) after the predetermined bend has been formed in step (c), allowing the temperature in the reformable area to drop to a temperature between the first temperature and the second temperature; and
   (f) during step (e), holding the pusher in contact with the non-reformable area.

7. The method of claim 1, wherein step (c) starts when the reformable area is at a third temperature corresponding to a third viscosity that is at least an order of magnitude lower than the first viscosity, the third temperature being between the first temperature and the second temperature.

8. The method of claim 1, wherein at an end of step (c), the predetermined bend has a final bend radius less than 20 mm.

9. The method of claim 1, wherein at an end of step (c), the predetermined bend has a final bend angle, measured from an initial position of the reformable area before step (c), greater than 60 degrees.

10. The method of claim 1, wherein the predetermined bend has a final bend angle, measured from an initial position of the reformable area before step (c), greater than 90 degrees at the end of step (c).

11. The method of claim 1, further comprising:
    (g) providing the sheet of glass material with a thickness in a range from 0.3 mm to 1.5 mm.

12. The method of claim 1, further comprising:
    (h) providing the sheet of glass material with a coefficient of thermal expansion greater than 5 ppm/K.

13. A thermo-mechanical reforming method, comprising:
    (a) heating a reformable area and a non-reformable area of a sheet of glass material to a first temperature corresponding to a first viscosity;
    (b) subsequently locally heating the reformable area to a second temperature corresponding to a second viscosity, the second viscosity being lower than the first viscosity; and
    (c) forming a predetermined bend in the reformable area during step (b) with a mechanical reforming tool, wherein the mechanical reforming tool comprises:
       a pusher;
       linear-to-rotary motion guide comprising a pair of angled brackets coupled to the pusher and configured to receive a linear motion, convert the linear motion to a rotary motion, and impart the rotary motion to the pusher; and
       an actuator coupled to the linear-to-rotary motion guide, wherein the predetermined bend is formed by contacting the pusher with an edge of the reformable area and displacing the actuator along a linear path to thereby rotate the pusher along a circular path and apply a pushing force to the edge area of the reformable area that results in the predetermined bend in the reformable area.

14. The method of claim 13, wherein contacting the pusher with the edge area of the reformable area comprises contacting the edge area of the reformable area with a flat surface of the pusher.

15. The method of claim 13, further comprising:
    (d) during step (b), allowing the reformable area to sag by gravity into an initial bend having an initial bend angle measured with respect to an initial position of the reformable area before sagging.

16. The method of claim 13, further comprising:
    (e) after the predetermined bend has been formed in step (c), allowing the temperature in the reformable area to drop to a temperature between the first temperature and the second temperature; and
    (f) during step (e), holding the pusher in contact with the edge area of the reformable area.

17. The method of claim 13, wherein step (c) starts when the reformable area is at a third temperature corresponding to a third viscosity that is at least an order of magnitude lower than the first viscosity, the third temperature being between the first temperature and the second temperature.

18. The method of claim 13, wherein at an end of step (c), the predetermined bend has a final bend radius less than 20 mm.

19. The method of claim 13, wherein at an end of step (c), the predetermined bend has a final bend angle, measured from an initial position of the reformable area before step (c), greater than 60 degrees.

20. The method of claim 13, wherein the predetermined bend is formed within 20 mm of an outermost edge of the sheet of glass material.

21. The method of claim 13, further comprising:
(g) providing the sheet of glass material with a thickness in a range from 0.3 mm to 1.5 mm.

22. The method of claim 13, further comprising:
(h) providing the sheet of glass material with a coefficient of thermal expansion greater than 5 ppm/K.

* * * * *